3,361,157
STATIC PRESSURE REGULATOR FOR AIR
FLOW CONTROLLERS
Albert W. Schach, Rockford, Ill., assignor to Barber-Colman Company, Rockford, Ill., a corporation of Illinois
Filed Sept. 15, 1965, Ser. No. 487,429
5 Claims. (Cl. 137—489)

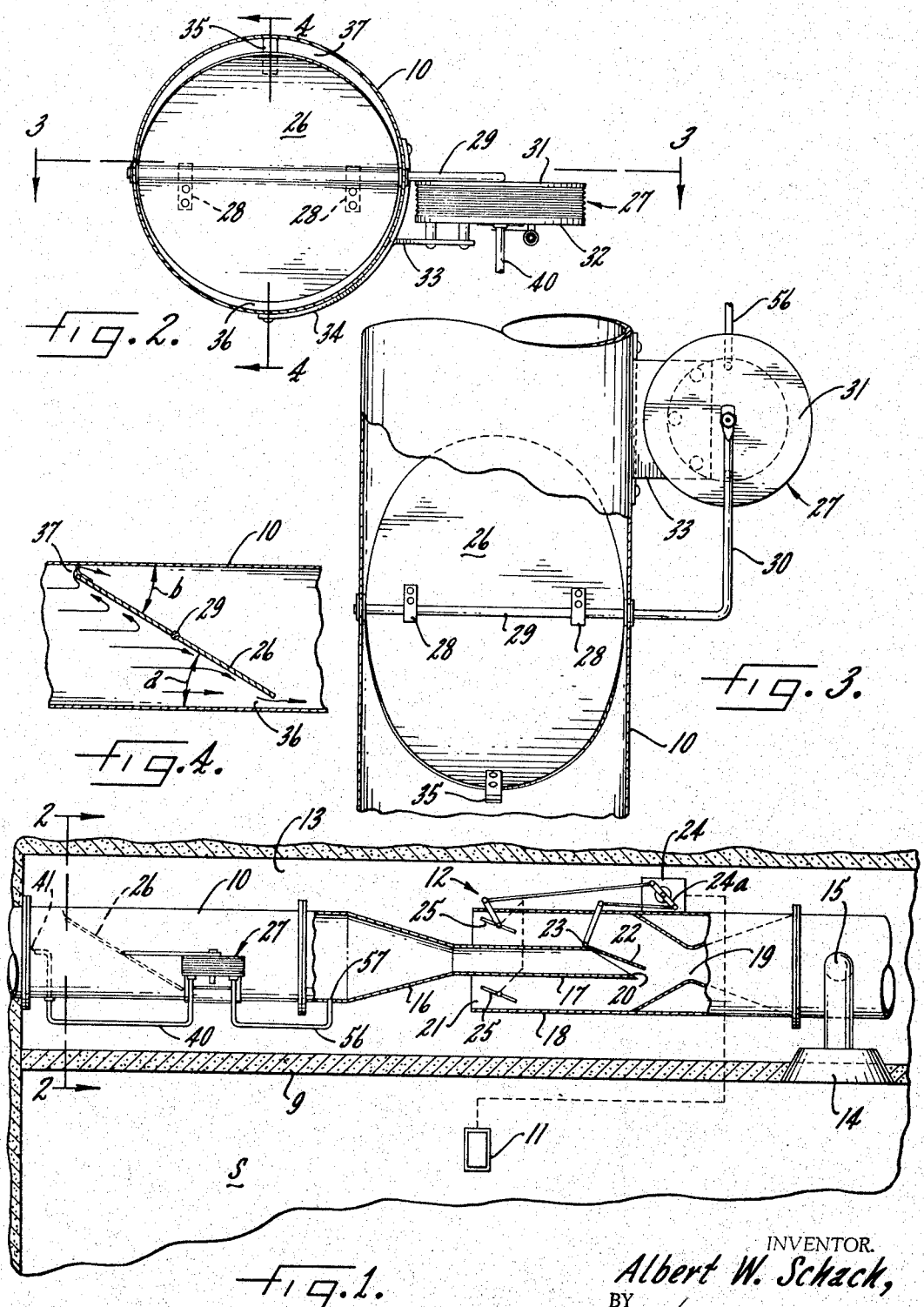

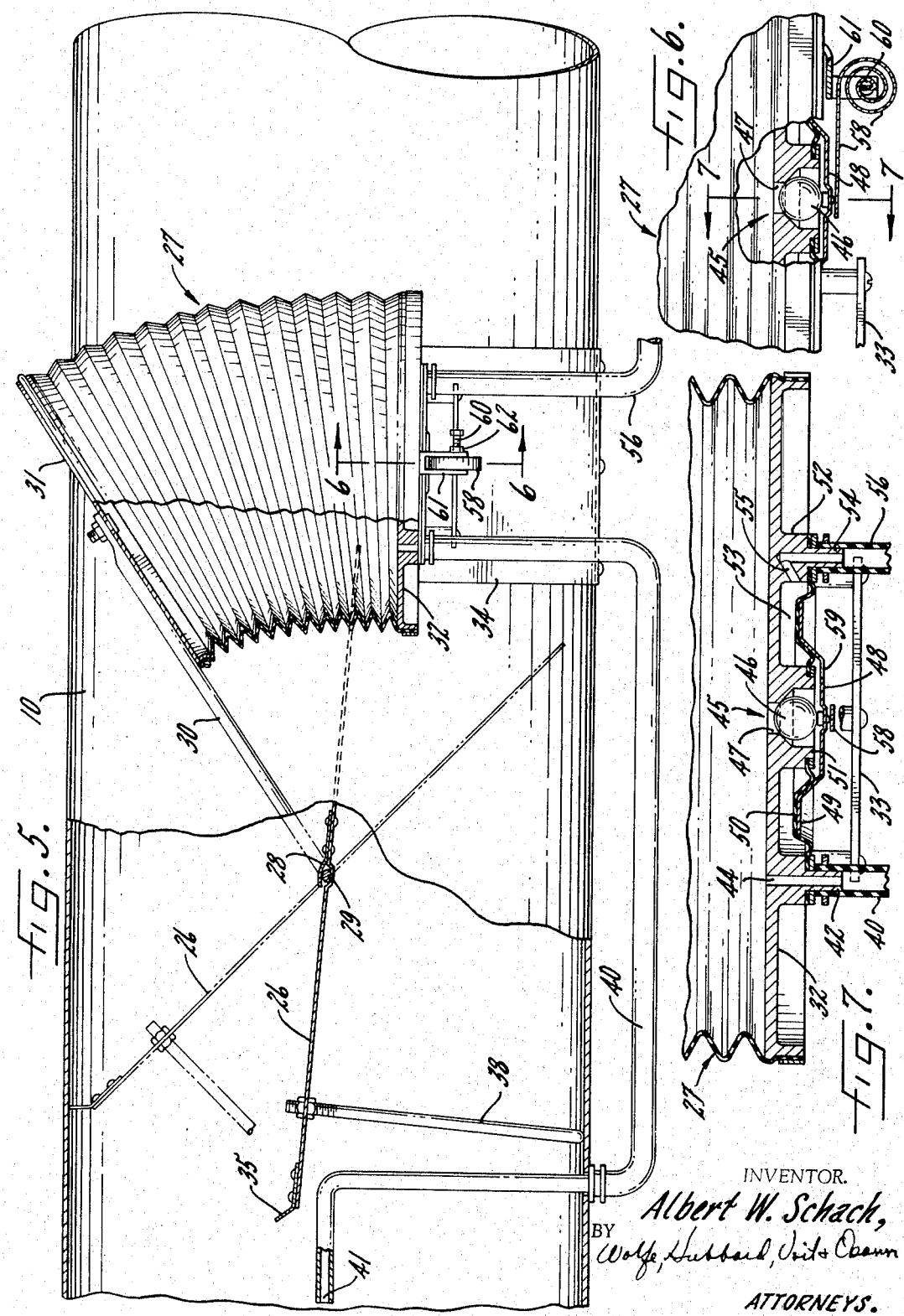

This invention relates to a regular for automatically maintaining a constant static pressure in an air duct leading to the inlet side of an air flow control damper in spite of changes in the position of the damper and variations in the pressure of the air supplied to the duct. The invention has more particular reference to a regulator of the type in which the static pressure is controlled by a second damper disposed upstream from the main damper and moved in the opening direction by power actuator energized from the total upstream pressure but controlled in response to changes in the static pressure within the duct and between the two dampers.

The primary object of the present invention is to achieve more accurate and uniform control in the maintenance of the static inlet pressure by utilizing the velocity pressure upstream of the regulating damper to provide enough of the damper closing force to avoid the necessity for spring loading the damper.

A more detailed object is to derive the damper closing force in a novel manner by the action of the supply velocity pressure on a damper of the butterfly type which extends diagonally across the duct and is disposed relative to the duct walls at substantial included angles when in closed position.

A further object is to limit the opening of the pressure regulating damper so that the supply pressure derived actuating force is exerted in all positions of the secondary damper.

Other objects and advantages of the invention will become apparent from the following detailed description taken in connection with the accompanying drawings, in which:

FIG. 1 is a fragmentary vertical section of the ceiling of a room equipped with an air conditioner and static pressure regulator embodying the novel features of the present invention.

FIG. 2 is an end view of the duct on the improved pressure regulator as viewed along the line 2—2 of FIG. 1.

FIGS. 3 and 4 are sectional views taken along the lines 3—3 and 4—4 of FIG. 2.

FIG. 5 is an enlargement of a part of FIG. 1 with part of the duct broken away.

FIG. 6 is a fragmentary section taken along the line 6—6 of FIG. 5.

FIG. 7 is a fragmentary section taken along the line 7—7 of FIG. 6.

The invention is especially adapted for use in air conditioning systems in which a plurality of units are arranged in parallel and supplied from a primary source of conditioned air which is delivered to the space to be conditioned through individual zone supply ducts 10 and in varying amounts determined by a thermostat 11. A system of this general type is shown in Patent 3,114,505 and in the accompanying drawings for purposes of illustrating the present invention.

In the system shown, the air conditioner indicated generally at 12 is mounted in a plenum chamber 13 above the ceiling 9 of a room S to be conditioned by the discharge of conditioned air downwardly through spaced distributors 14 each supplied through a branch pipe 15. Conditioned primary air is delivered at a suitable pressure into the end of the supply duct 10 which as shown is circular in cross-section, the downstream end of which is connected to the inlet 16 of the air conditioner 12 which leads to a tube 17 of reduced rectangular cross-section surrounded by the air conditioner casing 18. The tube terminates at an opening 20 alined with and short of a venturi orifice 19 within the casing. Between the tube 17 and the inlet end of the casing are openings 21 through which air in the plenum chamber 13, warmed as by heat from lights recessed into the ceiling, may be aspirated by venturi action into the casing thus becoming mixed with the primary air delivered through the opening 20.

The flow of the primary air to the orifice is regulated by a damper 22 fixed on a shaft 23 journaled along one side of the opening 20 and coupled through a crank and link to one end of a crank lever 24ª on the shaft of a reversible motor operator 24. Through a similar linkage, the other end of the crank is coupled to the shafts of dampers 25 regulating the aspiration flow into the casing through the inlets 21. The operator is controlled by a thermostat usually located in the conditioned space and the connections are arranged so that the damper 22 is open when the dampers 25 are closed and vice versa. As a result the temperature of the air mixture is varied automatically in accordance with the demands of the conditioned space.

In systems of the above character, particularly where a number of air conditioners are supplied with primary air from a common source, accurate control of the room temperature may be best achieved by maintaining substantially constant the static pressure of the air on the upstream side of the main damper 22. This is accomplished by automatically and properly varying the flow of air from the supply duct 10 to this space by adjusting the position of a second damper 26 arranged in the supply duct 10 and actuated by a bellows 27 which is moved in the damper opening position by the total pressure in the supply inlet. Such energization and closing of the damper is controlled by leakage of air out of the bellows in response to rises and falls in the static pressure in the inlet 16 between the two dampers 22 and 26.

The damper 26 is of the butterfly type and is fixed as by clamps 28 against a flat side of a shaft 29 which extends diametrically through and is journaled in opposite sides of the circular duct 10. Herein the outwardly projecting end of the shaft is bent to form a right angular arm 30, the other end of which is secured rigidly to a disk 31 which closes one end of the axially extensible and angularly bendable bellows 27. The opposite end wall of the bellows is sealed around and fixed to a disk 32 secured as shown in FIGS. 5 and 7 to a radially projecting arm 33 of a bracket 34 which is clamped as by screws to the outer face of the duct 10. The arrangement is such that when the duct is installed in the preferred horizontal position as shown in FIG. 5 or in one vertical position, the weight of the arm 30 and connected parts of the bellows biases the damper in the closing direction.

In accordance with the present invention and for a purpose to presently appear, the static pressure control damper is shaped to substantially but not fully close the full cross-sectional area of the duct at opposite ends of the damper when the later is in the limit closed position shown in FIG. 1 and in phantom in FIG. 5. In the partially open positions, the pressure of the oncoming air acts differently on the areas of the damper on opposite sides of its axis so as to develop a force differential and torque biasing the damper in the closing direction. For use in the cylindrical duct shown, this is accomplished by making the flat damper plate in the form of an elongated ellipse whose minor axis is slightly shorter than the duct diameter, the major axis being about twice the length of the minor axis. With the flat damper thus shaped and in the closed position (FIG. 4), opposite sides of the damper make acute included angles $a$ and $b$ relative to the opposite sides of the duct, these angles preferably being about 45 degrees or less.

The closed position of the damper 26 is limited by engagement of a bent up lug 35 on one end of the damper with the duct wall as shown in phantom in FIG. 5, the lug being long enough to space both ends of the damper away from the duct walls as shown in FIG. 4 so as to leave arcuate passage 36 and 37 around these ends as shown in FIG. 2. Thus, some air from the primary pressure source will flow past the closed damper as indicated by the arrows in FIG. 4. Because the lower half of the damper is inclined downwardly in the direction of the primary flow, the lower part of the air stream flows freely along the damper surface and through the space 36. But with the upper half of the damper inclined oppositely relative to the air flow, the direction of flow of part of the stream must be reversed in order to reach the space 37 and flow past the upper end portion of the damper. As a result of the increased resistance offered by this portion of the damper, a torque is developed which urges the damper clockwise, that is, in the closing direction. It will be apparent that this differential action of the oncoming air stream takes place in all degrees of opening of the damper and increases progressively from the open position of the damper as the effective areas of interception of the upper and lower parts of the air stream increase with the closing movement of the damper.

To insure that the differential action above referred to will be effective in the open position of the damper (FIG. 5) or at least after a short movement toward closed position, the damper in opening is stopped short of the horizontal and is slightly inclined. Such stopping is effected by engagement of the lower part of the duct wall with the end of a rod 38 projecting at right angles from the damper and fixed to the latter near the stop lug 35.

In the open position of the damper, the weight of the actuator arm 30 exerts its maximum torque in the damper closing direction. This, combined with the initial differential pressure action above described is sufficient to provide the necessary damper closing force without being supplemented by springs or the like which would necessitate a substantially larger bellows actuator.

It has been found that the differential force developed as above described is most effective when the damper, when closed, is disposed at an angle of 45 degrees or less. Such a small angle is also advantageous in shortening the range of movement of the bellows 27.

The total pressure of the oncoming primary air is transmitted to the interior of the bellows through a Pitot tube 40 extending through the duct wall and having an open end 41 facing upstream and spaced upstream from the damper 26. The other end of the tube is sealed around a tubular projection 42 formed on the base plate 32 and defining a passage 44 leading to the interior of the bellows. The orifice 41 and the passage 44 are correlated in size with the bellows so that the latter exerts a damper opening force of the proper magnitude and sufficient to overcome the combined damper closing forces above described.

The bellows force is reduced and the damper allowed to move in the closing direction whenever the static pressure within the duct and beyond the damper 26 falls below a desired value. This is accomplished by opening a spring closed valve 45 thus allowing air to bleed out of the bellows and the damper to close until the desired static pressure is restored. Herein the bleed valve comprises a ball 46 adapted to seat as shown in FIGS. 6 and 7 in the outer end of an orifice 47 leading to the interior of the bellows. The opposite side of the ball bears against the center of a disk 48 whose depressed periphery 49 lies against an annular flexible diaphragm 50 having an inner edge sealed against a hub 51 on the base plate 32. The outer edge of the diaphragm is clamped against a rib 52 on the plate which thus cooperates with the diaphragm to form an annular pressure chamber 53.

A tubular projection 54 on the plate communicates with the chamber 53 through a passage 55 and is sealed into the end of a tube 56 disposed outside the duct and extending downstream and into the duct where it terminates in a port 57 (FIG. 1). The latter faces radially of the duct so that only the static pressure in the inlet 16 is transmitted through the tube and to the chamber 53.

The end of a suitable spring 58 bears against the center of the disk 48 and urges the ball 46 toward its seat thus preventing air from bleeding out of the bellows and escaping through a hole 59 in the disk. Herein the spring is of the leaf type with one end portion spiraled around a screw 60 and anchored in a cross-slot in the screw shank. The latter threads into a lug 61 projecting from the plate 32 and its position it retained by a lock nut 62. With this cantilever mounting, the force of the spring and therefore the pressure in the chamber 53 at which the bleed valve 45 is allowed to open may be adjusted for the maintenance of any desired static pressure.

Assuming that the static pressure in the conditioner inlet 16 is below the value desired as determined by the setting of the spring 58, the pressure in the chamber 53 will be insufficient to overcome the spring force, the valve 45 thus being held closed. Air at the total supply pressure then flows through the tube 40 and into the bellows thus inflating the latter to swing the damper 26 toward open position against the gravitational force and the differential pressure above described then acting on the upstream face of the damper as shown in FIG. 4. As a result of such opening of the damper, more primary air flows past the damper and into the inlet space 16 thus increasing the static pressure therein.

The static component of such pressure increase is transmitted back through the tube 56 to the chamber to build up the force on the diaphragm opposing the spring. As soon as the preselected static pressure has been attained, the spring force will be overcome and the ball valve opened to release air from the bellows. This continues until the force developed by the bellows just balances the damper closing forces above described. The opening movement of the damper 26 is thus interrupted in a position which will maintain the selected static pressure so long as the bellows inflating and collapsing forces remain in balance at the prevailing opening of the bleed valve.

Now, if there is a change in the supply pressure, the position of the control damper 20 or other condition affecting the static pressure in the conditioner inlet, the bleed valve will be readjusted causing the damper 26 to be moved to a position for correcting for such pressure change and reestablishing the desired value thereof. If the static pressure increases above the desired value, the pressure in the chamber 53 will be increased thus causing further opening of the bleed valve. This is accompanied by a corresponding lowering of the bellows force which is eventually reduced below the combined forces biasing the damper in the closing direction. This causes the air flow to the space 16 to be decreased and results in lowering of the static pressure and corresponding closing of the bleed valve. As before, the closing is interrupted when the opposing forces are again balanced with the bleed valve in a new position establishing such balance. The static pressure then remains at the desired value thus reestablished until it again deviates from this value as a result of some new change in an operating condition.

It will be apparent that with the arrangement above described, the closing of the pressure regulating damper 26 is achieved without spring loading thereof and instead by a unique construction and arrangement of the damper and its connection with the bellows. As a result, the latter may be of small size and acts against closing forces which remain substantially uniform through the range of damper movement. Quick response and greater accuracy in the control of the static pressure are thus achieved by a structure which is much simpler and less expensive than similar regulators heretofore used.

I claim as my invention:

1. The combination of, a duct having an inlet at one end for receiving a supply of air under pressure and an outlet for delivering the air at a lower pressure toward a point of use, a first damper in said duct selectively adjustable to vary the flow of air from said outlet, a second generally flat butterfly type damper disposed in a cylindrical section of said duct upstream from said first damper and mounted to turn about an axis disposed intermediate its ends and extending diametrically of the duct, said damper being elliptical in shape substantially longer than the width of said duct so that, when the damper is swung to closed position, it extends diagonally of the duct axis and is disposed at an acute angle substantially less than a right angle whereby impingement of the oncoming air stream on the damper areas on opposite sides of said axis produces a force differential biasing said damper in the closing direction, means limiting the closing of said second damper to allow for the flow of air past the ends of the damper in the closed position of the latter, and an actuator continuously and variably opposing said biasing force to variably position said second damper comprising an expansible and contractible bellows having one wall fixed and a movable wall coupled to said second damper for opening and closing the latter in accordance with pressure changes within said bellows, a conduit communicating with the interior of said bellows and having an inlet located and facing upstream from said second damper, a valve controlling the bleeding air out of said bellows and means for closing and opening said bleed valve in accordance with increases and decreases in the static pressure in said duct between said first and second dampers.

2. The combination of, a duct having an inlet at one end for receiving a supply of air under pressure and an outlet for delivering the air at a lower pressure toward a point of use, a first damper in said duct selectively adjustable to vary the flow of air to said outlet, a second damper of the butterfly type disposed in said duct upstream from said first damper and rotatable between open and closed positions about an axis extending transversely of the duct, means limiting the closing movement of said butterfly damper so that, in said closing position, the ends thereof are spaced from opposite sides of the duct to allow air to flow past such ends, said second damper being sized and mounted to utilize the impingement of the oncoming air stream against the upstream areas of the second damper on opposite sides of the damper axis to produce a force differential biasing the damper toward said closed position, and an actuator continuously and variably opposing said biasing force to variably position said second damper comprising an expansible and contractible bellows having one wall fixed and a movable wall coupled to said second damper for opening and closing the latter in accordance with pressure changes within said bellows, a conduit communicating with the interior of said bellows and having an inlet located and facing upstream from said second damper, a valve controlling the bleeding air out of said bellows and means for closing and opening said bleed valve in accordance with increases and decreases in the static pressure in said duct between said first and second dampers.

3. A static pressure regulator as defined in claim 2 in which said second damper, when in maximum duct closing position, is disposed at an angle of about forty-five degrees or less relative to the longitudinal axis of the duct.

4. A static pressure regulator as defined in claim 2 in which said actuator includes an arm gravitationally urged in a direction to supplement said pressure derived force differential.

5. A static pressure regulator as defined in claim 2 including a stop for limiting the opening movement of said butterfly damper in a position short of the axis of said duct.

References Cited

UNITED STATES PATENTS 2,998,194  8/1961  Curran et al. _____ 137—489

M. CARY NELSON, *Primary Examiner.*

R. J. MILLER, *Assistant Examiner.*